United States Patent
Dutta et al.

(10) Patent No.: US 10,191,825 B2
(45) Date of Patent: Jan. 29, 2019

(54) SYSTEM AND METHOD FOR TESTING A DEVICE USING A LIGHT WEIGHT DEVICE VALIDATION PROTOCOL

(71) Applicant: Wipro Limited, Bangalore (IN)

(72) Inventors: Souvik Dutta, Kolkata (IN); Debasish Chanda, Maheshtala (IN); Swarup Mandal, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 25 days.

(21) Appl. No.: 15/463,818

(22) Filed: Mar. 20, 2017

(65) Prior Publication Data

US 2018/0253364 A1    Sep. 6, 2018

(30) Foreign Application Priority Data

Mar. 1, 2017 (IN) .............................. 201741007260

(51) Int. Cl.
*G06F 11/22* (2006.01)
*H04L 12/26* (2006.01)

(52) U.S. Cl.
CPC .......... *G06F 11/2273* (2013.01); *H04L 43/50* (2013.01)

(58) Field of Classification Search
CPC ............. G06F 11/2273; G06F 11/3664; G06F 11/3668
USPC .......................... 702/122; 455/466; 717/124
See application file for complete search history.

(56) References Cited

U.S. PATENT DOCUMENTS

| 2003/0208542 | A1 | 11/2003 | Deming et al. |
| 2011/0302269 | A1 | 12/2011 | Keene |
| 2013/0172028 | A1* | 7/2013 | McNamara ........... H04L 67/104 455/466 |
| 2015/0331784 | A1 | 11/2015 | Nanjundappa et al. |

OTHER PUBLICATIONS

"Lightweight Machine to Machine Technical Specification; OMA-TS-LightweightM2M-V1_0-20170113-D", OMA-TS-LIGHTWEIGHTM2M-V1_0-20170113-D, Open Mobile Alliance (OMA), URL:ftp/Public_documents/DM/LightweightM2M/Permanent_documents/, No. 1.0, Jan. 13, 2017, pp. 1-153.
Van Der Stok, P. et al., "CoAP Management Interface; draft-vanderstok-core-comi-09.txt", *IETF*, Mar. 7, 2016, pp. 1-48.
Extended European Search Report issued in the European Patent Office in counterpart European Application No. 17178883.9, dated Nov. 14, 2017, 10 pages.

* cited by examiner

*Primary Examiner* — John H Le
(74) *Attorney, Agent, or Firm* — Finnegan, Henderson, Farabow, Garrett & Dunner, L.L.P.

(57) ABSTRACT

This disclosure relates generally to device testing, and more particularly to a system and method for testing a device using a light weight device validation (LWDV) protocol. This includes accessing a test script corresponding to a test case testing the device. The test script includes a set of mutually independent primitive executables. The method includes packetizing one or more of the set of primitive executables based on a LWDV protocol. The method further includes transmitting the one or more encoded primitive executables to the device for execution.

16 Claims, 6 Drawing Sheets

SYSTEM AND METHOD FOR TESTING A DEVICE USING A LIGHT WEIGHT DEVICE VALIDATION PROTOCOL

TECHNICAL FIELD

This disclosure relates generally to device testing, and more particularly to system and method for testing a device using a light weight device validation protocol.

BACKGROUND

Over the past several years, physical size of computing devices has decreased dramatically. Miniature devices having limited computing power, low power requirement, and mini to ultra-mini in form factor, have become ubiquitous and are revolutionizing the way machines could help humans. They are finding wide applications and adaptation in various areas and industries, such as, retail, transportation, defense and healthcare. Due to the nature of such miniature devices and their intended purposes, applications running on them are becoming more and more complex and demand higher quality.

The existing test methodologies require significant computing resources (e.g., memory, processing capability, etc.) in a target device (i.e., device under test). As will be appreciated, the amount of computing resources available on such miniature devices may be very limited, and therefore testing of applications or components in such devices may be limited. For example, a miniature device may not even have enough memory to deploy a full fledge device agent (DA) as required by some of the existing testing methodologies. Moreover, resource availability may vary dynamically during the course of test execution, and may lead to termination of the testing session in such miniature devices. In short, the limited and dynamic resource availability in a miniature device make the existing testing methodologies unfit and ineffective for testing the miniature device.

Further, existing techniques employ a request-response based protocols to provide communication between a test agent and device agent. However, XML or JSON based payload used in existing request-response based protocols makes the footprint of DA higher with respect to small memory size of the miniature device. Additionally, XML or JSON parsing logic may be expensive in terms of memory and computation for such miniature devices. Further, existing request-response based protocols give the only the final result (i.e.; PASS/FAIL), thereby making it difficult to pinpoint the place where test case breaks. A manual troubleshooting in such miniature devices is tedious due to complex environment setup.

SUMMARY

In one embodiment, a method for testing a device is disclosed. In one example, the method comprises accessing a test script corresponding to a test case for testing the device. The test script comprises a set of mutually independent primitive executables. The method further comprises packetising one or more of the set of primitive executables based on a light weight device validation (LWDV) protocol. The method further comprises transmitting the one or more packetized primitive executables to the device for execution.

In one embodiment, a system for testing a device is disclosed. In one example, the system comprises at least one processor and a memory communicatively coupled to the at least one processor. The memory stores processor-executable instructions, which, on execution, cause the processor to access a test script corresponding to a test case for testing the device. The test script comprises a set of mutually independent primitive executables. The processor-executable instructions, on execution, further cause the processor to encode one or more of the set of primitive executables based on a light weight device validation (LWDV) protocol. The processor-executable instructions, on execution, further cause the processor to transmit the one or more encoded primitive executables to the device for execution.

In one embodiment, a non-transitory computer-readable medium storing computer-executable instructions for testing a device is disclosed. In one example, the stored instructions, when executed by a processor, cause the processor to perform operations comprising accessing a test script corresponding to a test case for testing the device. The test script comprises a set of mutually independent primitive executables. The operations further comprise packetising one or more of the set of primitive executables based on a light weight device validation (LWDV) protocol. The operations further comprise transmitting the one or more encoded primitive executables to the device for execution.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
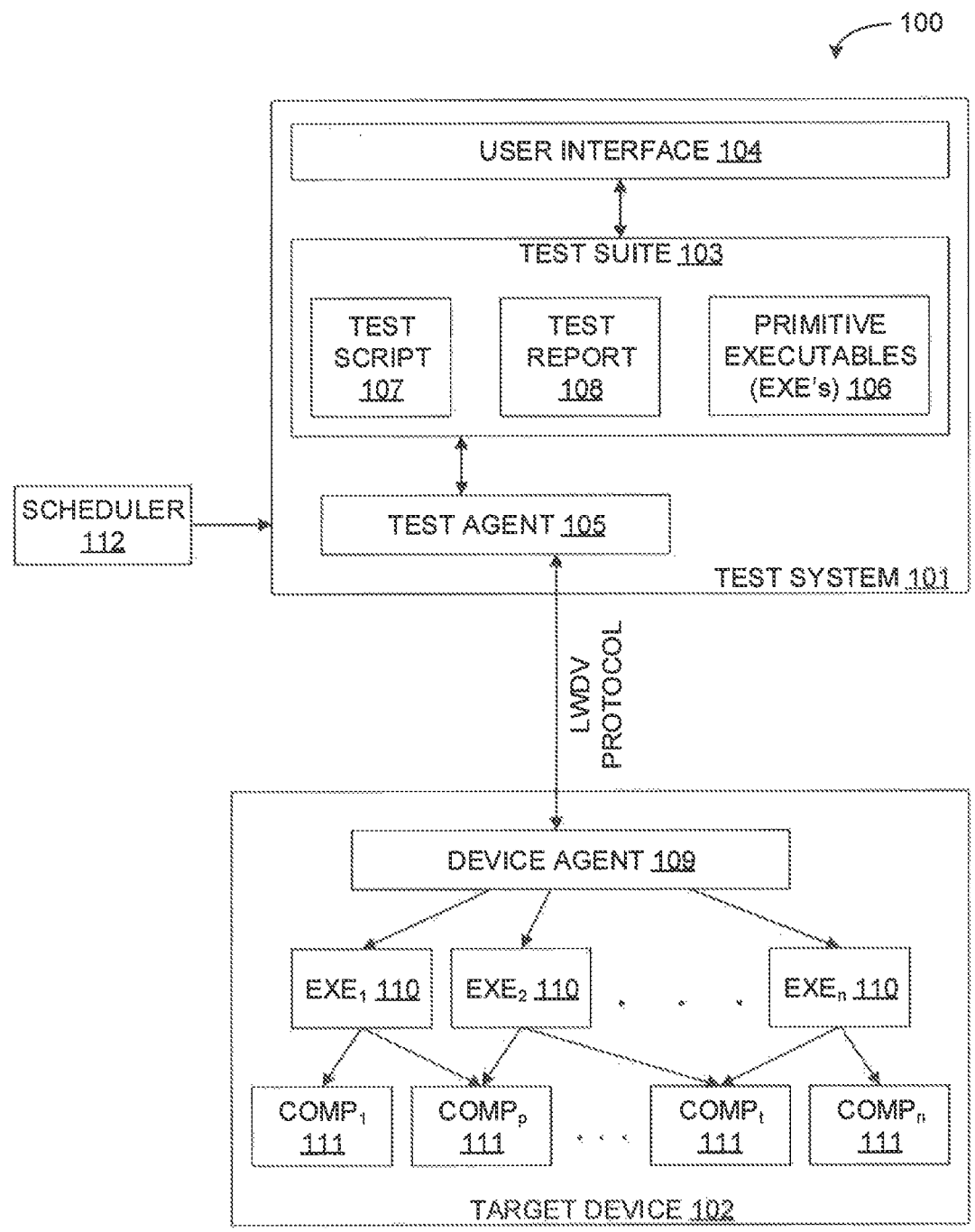
FIG. 1 is a block diagram of an exemplary system for testing a device in accordance with some embodiments of the present disclosure.

Referring now to FIG. 1, an exemplary system 100 for testing a device is illustrated in accordance with some embodiments of the present disclosure. The system 100 comprises a test system 101 remote from one or more target devices 102 to be tested. The target device 102 may also be referred to as device under test (DUT). The test system 101 comprises a test suite 103, a user interface 104, and a test agent 105. The test suite 103 comprises a number of primitive executables 106 (EXE's), a number of test scripts 107 corresponding to various test cases for testing the target devices 102, and test reports 108. The target device 102 comprises a device agent 109 that executes one or more primitive executables 110 ($EXE_1$, $EXE_2$, ... $EXE_n$) received from the test agent 105 by interacting with various components 111 ($COMP_1$, $COMP_p$, ... $COMP_r$, $COMP_n$) in the target device 202.

The primitive executables 106 are executables corresponding to various atomic operations required to be performed on the target device 102. The primitive executables 106 may be manually or automatically created to perform the atomic operations. Each of the test scripts 107 correspond to a test case for testing a given target device 102. As will be appreciated, the test case may vary based on the target device 102. The test script 107 may be created using primitive executables 106 corresponding to steps in the test script 107. It should be noted that each of the test steps may contain information on dependent test step. The test script 107 will evaluate the test case by executing primitive executables 106, and comparing the result with expected result mentioned in test case. Each of the test reports 108 is a result of execution of a test script 107 (i.e., related primitive executables 106).

The user interface 104 enables the user (e.g., tester) to upload the test cases. The user interface 104 further enables the user to group the test cases so that a set of test cases may be executed based on a scenario (e.g., stress, regression etc.). Additionally, the user interface 104 enables the user to upload or create test scripts 107 corresponding to the test case. For example, the user interface 104 provides an editor (e.g., WYSIWYG editor) so as to enable the user to create the test script for each of the test cases, and/or to create mapping between test case and test scripts. The user interface 104 also enables the user to generate the test report based on the result of test execution. In some embodiments, the user may view or export the test report in .xls, .doc, .pdf, or any other pre-defined or user selected format. Further, the user interface 104 enables the tester to upload or create target device specific primitive executables 106 for each of the uploaded or created test scripts 107.

The test agent 105 interacts with one or more target devices 102 via corresponding device agents 109 using an existing request-response based protocol. Alternatively, the test agent 105 may communicated with one or more device agents 109 using a light weight device validation (LWDV) protocol in accordance with some embodiments of the present disclosure. In some embodiments, the test agent 105 communicates with the device agent 109 via a test TP that acts as a bearer for the communication with the device agent 109. As will be appreciated, a scheduler 112 triggers a test session to perform the testing on the target device 102. In some embodiments, the scheduler 112 selects the appropriate test case from the test suite 103 and a target device 102 using the user interface 104, and triggers a test session via the test agent 105. The test agent 105 accesses the primitive executables corresponding to the test script which in turn corresponds to the selected test case, and provides the same to the device agent 109 of the selected target device for execution. The test agent 105 further receives the result of execution of the primitive executables from the target device 102, and compiles the same to determine the result of execution of the test script 107. The result is provides to the test suite 103 as test report 108.

The device agent 109 in each of the target device 102 communicates with the test agent 105 of the test system 101. In some embodiments, the device agent 109 communicates with the test agent 105 via a device TP that acts as a bearer for the communication with the test agent 105. The device agent 109 executes the commands received from the test agent 105. Thus, the device agent 109 executes the test script 107 corresponding to the test case on the target device 102 as per the instructions received from the test agent 105. The device agent 109 receives the primitive executables 110 corresponding to the test script 107, and executes the same by interacting with various components 111 in the target device 102. The device agent 109 further provides result of execution of the primitive executables 110 to the test agent 105. Additionally, the device agent 109 determines availability of computing resources in the target device 102 and intimates the test agent 105 of the same. As will be appreciated, the determination of the availability may be performed at periodic interval, or upon request by the test agent 105 at run time. The periodicity may be pre-defined based on the nature of the target device.

Thus, each test script 107 is composed of a set of primitive atomic operations. To execute these atomic operations appropriate primitive executables 106 may be developed for each such operation. The test agent 105 executes the test scripts by sending the set of primitive executables 106 to the device agent 109 for performing the corresponding operations. As will be appreciated, the primitive executables are smaller in size, and interact with components 111 of the target device 102. The test agent 105 considers availability of resource in runtime and sequence the test executions to overcome the resource constraint at run time while ensuring optimum test execution time and component coverage.

By way of example, the user creates or uploads multiple primitive executables 106 via the user interface 104. The user further creates a test script 107 corresponding to a test case using multiple primitive executables 106 via the user interface 104. During operation, the test agent 105 receives a request for performing test on a given target device 102 from the scheduler 112. Upon reception of request from the scheduler 112, the test agent 105 may access primitive executables related to the test script 107 for the given target device 102, and provides the same to the device agent 109 for execution. The test agent 105 first determines availability of computing resources on the given target device 102 through the device agent 109. The test agent 105 then provides the related primitive executables to the device agent 109 in sequence or in batches based on resource availability in the target device 102. The device agent 109 executes the test script 107 by executing the related primitive executables 110 as received, and provides the result of execution back to the test agent 105. The test agent 105 receives the results of execution of primitive executables 110 upon each execution, and aggregates the same once the results of execution of all primitive executables have been received so as to determine the result of execution of the test script 107 on the target device 102. The test agent 105 then provides the result of execution of the test script 107 as test report 108.

It should be noted that the above discussed subsystems, components, engines, modules, agents, etc. may be implemented in programmable hardware devices such as programmable gate arrays, programmable array logic, programmable logic devices, and so forth. Alternatively, the subsystems, components, engines, modules, agents, etc. may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices. For example, all such aforementioned modules (e.g., test suite 103, user interface 104, test agent 105, device agent 109, scheduler 112, etc.) may be represented as a single module or a combination of different modules. Further, each of the modules may reside, in whole or in parts, on one device or multiple devices in communication with each other.

As will be appreciated by those skilled in the art, the techniques described in the embodiments discussed above provide for an optimized, efficient, and cost effective mechanism for testing devices. The testing techniques described above have low footprint (i.e., reduced resource usage and reduced computational load) on the device being tested. For example, the size of device agent (approximately in the order of about 20-30 kilobytes) required by the techniques described above is significantly smaller in comparison to the size of device agent (approximately in the order of about 300-400 kilobytes) employed by existing techniques. Additionally, the techniques described in the various embodiments discussed above reduce the probability of failure of test case execution on a device since the test case execution are sequenced based on the resource available at target device on run time and estimated resource usage by the primitive executables. For example, in a telematics device with RAM and ROM size of 64 KB and 4 MB respectively, the techniques described above reduce the probability of failure of test case execution by about 30%.

The techniques described in the various embodiments discussed above are therefore suitable for testing resource constrained devices such as miniature computing devices. The miniature computing devices may include, but are not limited to, activity trackers, smart watches, smart glass, smart sensors, in-vehicle infotainment system, miniature plug-and-play devices, miniature storage solutions, Internet of Things (IoT) devices, and other wearable devices. These miniature devices may run one or more real-time applications over a light-weight and optimized operating system (e.g., Windows 10 IoT, Google Brillio, RIOT OS, etc.).

As stated above, the existing testing techniques as well as the testing techniques described in the embodiments discussed above may employ any of the existing request-response based protocols to provide communication between the test agent and the device agent. However, the existing protocol use XML or JSON based payload, which makes the footprint of the device agent higher particularly with respect to small memory size of the resource constrained device. Additionally, XML or JSON parsing logic may be expensive in terms of memory and computation for such resource constrained device. Further, existing request-response based protocols give the only the final result (i.e.; PASS/FAIL), thereby making it difficult to pin-point the place where test case breaks. A manual troubleshooting in such miniature devices is tedious due to complex environment setup.

It is therefore desirable to provide an efficient, effective, and light weight protocol for communication between the test agent and the device agent so as to further optimize testing of the devices. For example, it is desirable to provide a low footprint protocol to suit resource constraint in miniature devices. Additionally, it is desirable to provide a protocol that performs required functions with less number of transactions between the test agent and the device agent. Further, it is desirable to provide a protocol that report exact point of failure of the test case so as to augment the troubleshooting process.

Figure 2:
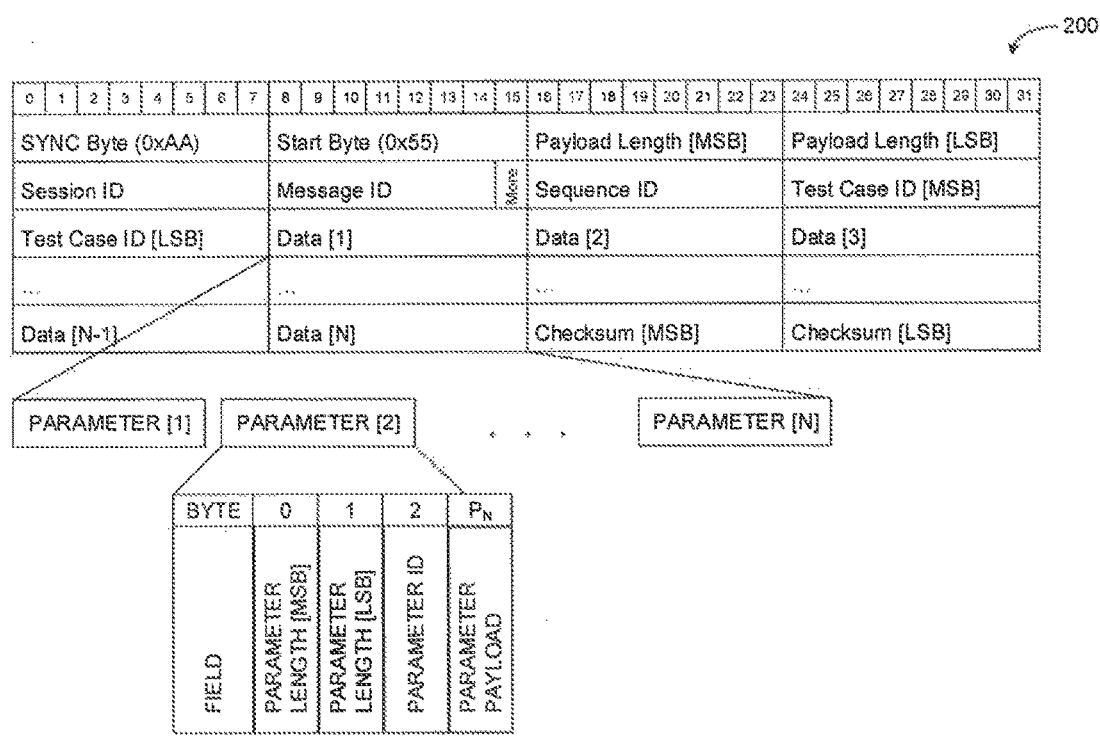
FIG. 2 illustrates a message format of an exemplary light weight device validation (LWDV) protocol in accordance with some embodiments of the present disclosure.

Referring now to FIG. 2, a message format of an exemplary light weight device validation (LWDV) protocol for communication between the test agent and the device agent is illustrated in accordance with some embodiments of the present disclosure. The LWDV protocol may be in a tag-length-value (TLV) based message format. In some embodiments, the TLV based message format may be a 32 bit message format. As will be appreciated, the TLV based message format is more compact than conventional XML or JSON based message format used in existing protocols.

As illustrated, the LWDV protocol is adapted to represent message as a series of data fields. The data fields comprise a SYNC byte field, a start byte field, a payload length field, a session identification (session ID) field, a message identification (message ID) field, a sequence identification (sequence ID) field, a test case identification (test case ID) field, a core data (Data [i]) field, and a checksum field. Each of these fields will be described in greater detail herein below.

The SYNC byte field is a standard field used for communication over a serial line (e.g., RS232). In some embodiments, the SYNC byte field may be of one byte (8 bits) and comprises hexadecimal number 0xAA as standard data. The start byte field is another standard field used for communication over a serial line (e.g., RS232). Again, in some embodiments, the start byte field may be of one byte (8 bits) and comprises hexadecimal number 0x55 as standard data. The payload length field represents length of the message from the session identification field to the checksum field and inclusive of both the fields. In some embodiments, the payload length field may be of two bytes (16 bits). The first byte represents 8 most significant bits (MSB), and the second byte represents 8 least significant bits (LSB).

The session identification field represents identification of a particular test session. In some embodiments, the session identification field may be of one byte (8 bits). The message identification field represents identification of a particular message. In some embodiments, the session identification field may be of one byte (8 bits). It should be noted that the message identification field comprises a more bit field (1 bit) to indicate if the data is complete (i.e., more bit is 0) or if more data is expected in subsequent message (i.e., more bit is 1). By way of example, in some embodiments, different types of messages will be described in greater detail with the help of Table A below:

TABLE A

Message Details

| Message ID | Data Size | Description | Direction |
|---|---|---|---|
| MSG_CTRL_START | None | The message starts the interaction between the test agent and the device agent. | Test agent to device agent |
| EVT_DUT_CAPABILITY | Resource1: 2 bytes, Resource2: 2 bytes, . . . ResourceN: 2 bytes | The message notifies currently available resource status of the target device. The message may be sent periodically or at run time. | Device agent to test agent |
| MSG_START_SESSION | None | The message initiates the execution of all test case for a given test suite. | Test agent to device agent |
| MSG_START_TEST_CASE | Test case ID: 2 bytes | The message initiates the starting of test case. | Test agent to device agent |
| MSG_EXEC_EXE | No of EXE's: 1 byte, EXE ID: 2 bytes, Content Length: 2 bytes, Content: N byte(s), EXE ID: 2 bytes, Content Length: 2 bytes, Content: N byte(s), Checksum: 2 bytes | The message sends at least one primitive executable (EXE) for download onto the target device. Multiple executables (EXE's) may be sent if batch execution is possible. | Test agent to device agent |
| MSG_EXEC_EXE_ACK | None | The message sends the acknowledgement for MSG_EXEC_EXE, when storing of EXE's are successful. | Device agent to test agent |
| EVT_EXE_STARTING | EXE ID: 2 bytes | If the target device has enough memory for the EXE execution, the message notifies the test execution before starting the execution of EXE. | Device agent to test agent |
| EVT_EXE_RESULT | EXE ID: 2 bytes, Sequence No.: 4 bytes, Content Length: 2 bytes, Content or Result: N byte(s), Checksum: 2 bytes | The message sends the result after execution of each EXE. | Component to test agent |
| EVT_EXE_ENDING | EXE ID: 2 bytes | The message indicates the completion of execution of a particular EXE. | Component to test agent |
| MSG_END_TEST_CASE | Test case ID: 2 bytes | The message indicates completion of a particular test case. | Test agent to device agent |
| MSG_END_SESSION | None | The message indicates completion of all the test cases for the test suite. | Test agent to device agent |
| MSG_CTRL_END | None | The message ends the interaction between the test agent and the device agent. | Test agent to device agent |

The sequence identification field represents sequence number of a current message in case the message is divided into multiple fragments. In some embodiments, the sequence identification field may be of one byte (8 bits). This field may be employed to retry the message fragment in case transmission of the fragment fails rather than sending the complete message all over again. The test case identification field represents identification of the test case. In some embodiments, the test case identification field may be of two bytes (16 bits). The first byte represents 8 most significant bits (MSB), and the second byte represents 8 least significant bits (LSB).

The core data fields (i.e., data [1] through data [N]) represent one or more parameters. The parameter may comprise a content of the message provided by the message identification field. In some embodiments, each of the core data field may be of one byte (8 bits). Each of the parameters comprises a parameter length field (i.e., length of TLV based message format) and a parameter identification field (i.e., tag of TLV based message format). The parameter length field represent length of the parameter from the parameter identification field to the payload field and inclusive of both the fields. In some embodiments, the parameter length field may be of two bytes (16 bits). The first byte represents 8 most significant bits (MSB), and the second byte represents 8 least significant bits (LSB). The parameter identification field represents identification of a particular parameter. In some embodiments, the parameter length field may be of one byte (8 bits). Thus, in some embodiments, each of the parameters comprises a minimum of 3 bytes (24 bits).

In some embodiment, each of the parameter further comprises a payload field (i.e., value of TLV based message format). The payload field comprises the parameter data or the content of the parameter for the given parameter identification. The content may comprises primitive executables, identifications of primitive executables, result of execution of primitive executables, and so forth. In some embodiments, the payload field may be of N bytes depending on the length of the content.

The checksum field represents a sum of the correct digits in the transmitted message, against which subsequent comparisons may be made to detect errors in the data. In some embodiments, the checksum field may be of two bytes (16 bits). The first byte represents 8 most significant bits (MSB), and the second byte represents 8 least significant bits (LSB).

Figure 3A:
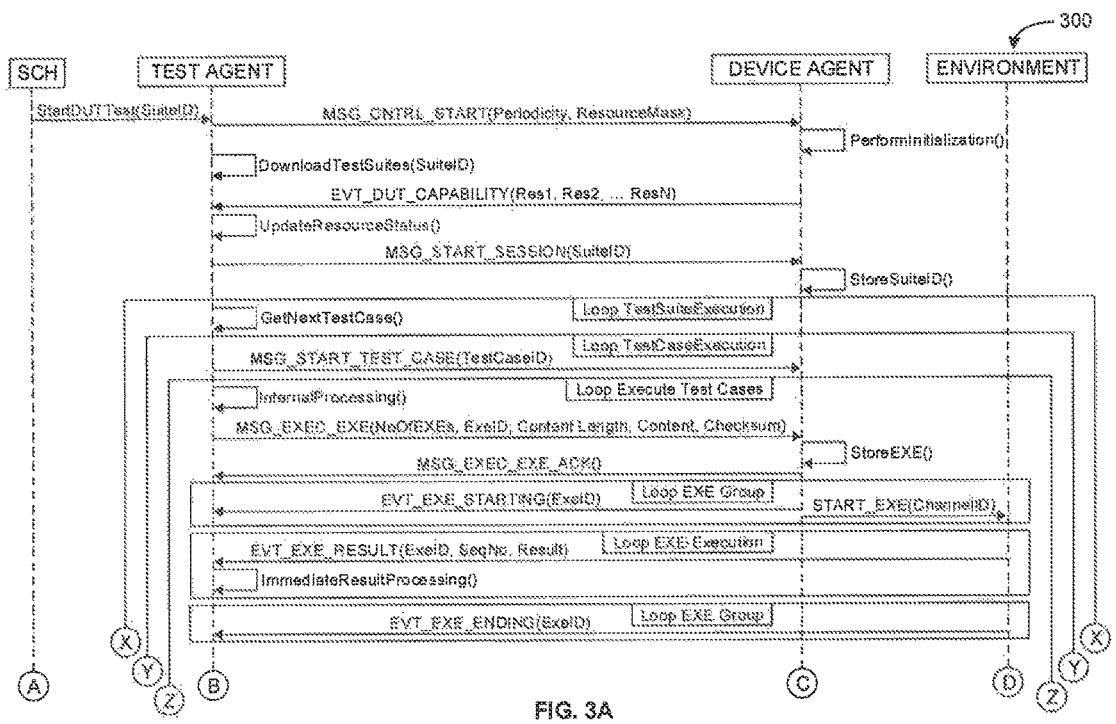
FIG. 3A and FIG. 3B illustrate an exemplary communication flow between a test agent and a device agent using the LWDV protocol for testing a device in accordance with some embodiments of the present disclosure.
Figure 3B:
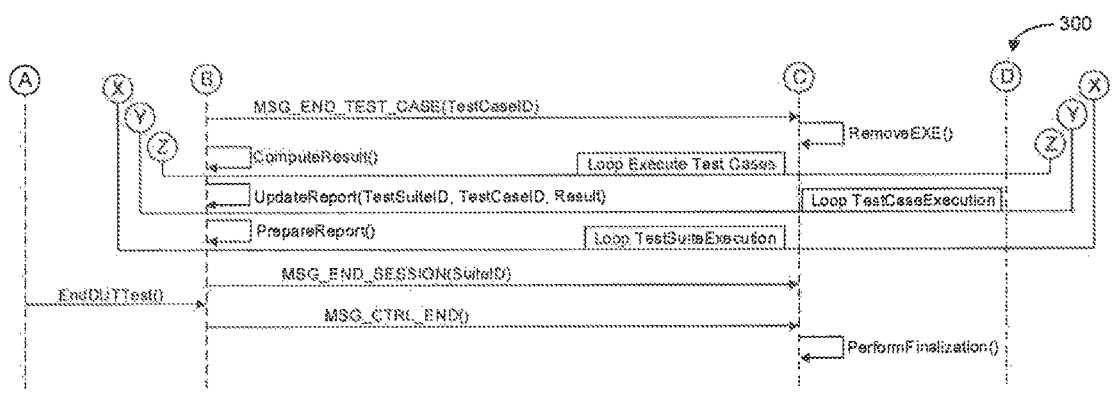

Referring now to FIG. 3A and FIG. 3B, an exemplary communication flow between the test agent and the device agent using the LWDV protocol for testing the device is illustrated in accordance with some embodiments of the present disclosure. As illustrated, the scheduler may select appropriate test suite using the user interface, and may initiate the test session using STARTDUTTEST message with a suite ID. On receiving the request from the scheduler, the test agent may send MSG_CTRL_START message to the device agent with a periodicity and a resource mask to initiate. Once initialized, the device agent may send availability of the resources in the target device to the test agent using EVT_DUT_CAPABILITY message at a periodical interval based on the periodicity. It should be noted that, in some embodiments, the device agent may send availability of the resources in the target device to the test agent at a run time upon receipt of the MSG_CTRL_START message. In such case, the MSG_CTRL_START message may not provide the periodicity. The EVT_DUT_CAPABILITY message may also contain resources required for the test suite to run (e.g. available RAM, EEPROM, etc.) based on the resource mask. The test agent may then update the present available resource status in a non-volatile storage. The device agent may then perform the initialization of the target device environment accordingly. Additionally, the test agent may download all the test cases in the test suite based on the suite ID.

The test agent may then send MSG_START_SESSION message with the suite ID to the device agent to start execution of test cases in the test suite. The device agent may store the suite ID. The test agent may then start executing the test cases in the test suite. For each test case in the test suite, the test agent may select a next appropriate test case based on resource usage for the test case, time to execute the test case, and component coverage of the test case. The resource usage for the test case may be determined as a function of resource requirement and resource availability for all resources in the target device.

The test agent may then send MSG_START_TEST_CASE message with the test case ID of the selected test case to the device agent for starting the execution of the selected test case. As noted above, each test case may have to execute related primitive executables (EXE's) to perform the intended test steps. The test agent may group at least few of the related EXE's on-the-fly based on the available resource in the target device. The grouping may be performed by taking a few EXE's in sequence that meet the predecessor dependency constraints mentioned in test script for parallel execution in the target device.

For execution of each group of EXE's, the test agent may perform prerequisite internal processing to fulfil the precondition for the test case. On completion of the internal processing, the test agent may send MSG_EXEC_EXE message to the device agent for pushing the content of EXE's. The MSG_EXEC_EXE message may be sent with a number of EXE's, EXE ID of each EXE, content length of each EXE, content of each EXE, and checksum. On receiving the above message, the device agent may remove content of any previous EXEs and stores the content of new EXE's in a pre-defined memory area. The device agent may then send MSG_EXEC_EXE_ACK message to the test agent to acknowledge the successful receipt and storage of the EXE's. Additionally, the device agent may send EVT_EXE_STARTING message with the EXE ID to the test agent before starting execution of any of the provided EXEs. Subsequently, the device agent may start execution of the given EXE (i.e., EXE of the given EXE ID) on the target device using START_EXE message with the channel ID. As will be appreciated, the method of execution of the EXE's may be based on the target environment.

During execution of the EXE's in the target device, all intermediate result may be notified by the device agent to the test agent by sending multiple EVT_EXE_RESULT message with EXE ID, sequence number, and result. The test agent may perform processing of the intermediate result based on the test script, and may log any failure information for future troubleshooting reference. The protocol may therefore report exact point of failure of the test case and augment the troubleshooting process. If any test step has a predecessor and the predecessor test step fails, the device agent may skip execution of that test step as that step may fail as well. The described process as well the protocol may therefore make the test execution faster while having better component coverage as it does not break the test case immediately. On completion of execution, the device agent may sends EVT_EXE_ENDING message to the test agent with the EXE ID.

After execution of all EXEs in the test case, the test agent may send MSG_END_TEST_CASE message to the device agent with the test case ID. On reception of above message, the device agent may remove the last EXE from the predefined memory area of the target device. The result of the test case may be computed by the test agent based on all the intermediate results received during execution of the EXE's. The result of the test case may then be updated in the test report based on the test suite ID, test case ID, and result. A test report for the entire test suite may then be prepared based on result of execution of all the test case. Upon preparation of the result, the test agent may send MSG_END_SESSION message to the device agent along with the suite ID so as to end execution of the test suite. Finally, the test agent may send MSG_CTRL_END message to the device agent so as to end the test session.

As will be appreciated by one skilled in the art, a variety of processes may be employed for testing a device. For example, the exemplary system 100 may perform testing of the device by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
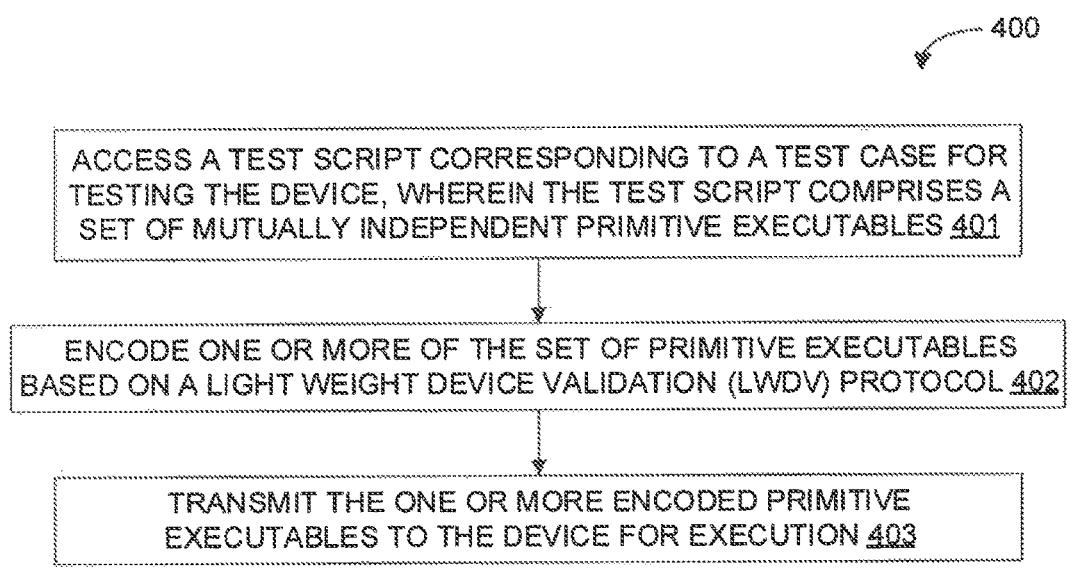
FIG. 4 is a flow diagram of an exemplary process for testing the device in accordance with some embodiments of the present disclosure.

For example, referring now to FIG. 4, exemplary control logic 400 for testing a device via a system, such as system 100, is depicted via a flowchart in accordance with some embodiments of the present disclosure. As illustrated in the flowchart, the control logic 400 includes the step of accessing a test script corresponding to a test case for testing the device at step 401. The test script comprises a set of mutually independent primitive executables. The control logic 400 further includes the steps of packetizing one or more of the set of primitive executables based on a light weight device validation (LWDV) protocol at step 402, and transmitting the one or more encoded primitive executables to the device for execution at step 403.

In some embodiments, the control logic 400 further includes the step of receiving a result corresponding to the execution of the one or more primitive executables from the device. Further, in some embodiments, transmitting the one or more encoded primitive executables comprises determining an availability of each of one or more resources in the device via the LWDV protocol, and transmitting the one or more encoded primitive executables to the device based on the availability.

In some embodiments, the control logic 400 further includes the step of receiving an acknowledgement upon successful transmission of the one or more of the set of primitive executables to the device, via the LWDV protocol. Additionally, in some embodiments, the control logic 400 further includes the step of receiving an intimation upon starting the execution of the one or more of the set of primitive executables on the device, via the LWDV protocol. Moreover, in some embodiments, the control logic 400 further includes the step of receiving an intimation upon successful completion of the execution of the one or more of the set of primitive executables on the device, via the LWDV protocol.

In some embodiments, the LWDV protocol is in a tag-length-value (TLV) based message format. Further, in some embodiments, the LWDV protocol is adapted to represent message as a series of data fields. The data fields comprise a SYNC byte field, a start byte field, a payload length field, a session identification field, a message identification field, a sequence identification field, a test case identification field, a core data field, and a checksum field. The message identification field includes a more bit field. Additionally, in some embodiments, the core data field holds one or more parameters. Each of the one or more parameters comprises a parameter length field and a parameter identification field. Moreover, in some embodiments, each of the one or more parameters further comprises a payload field.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
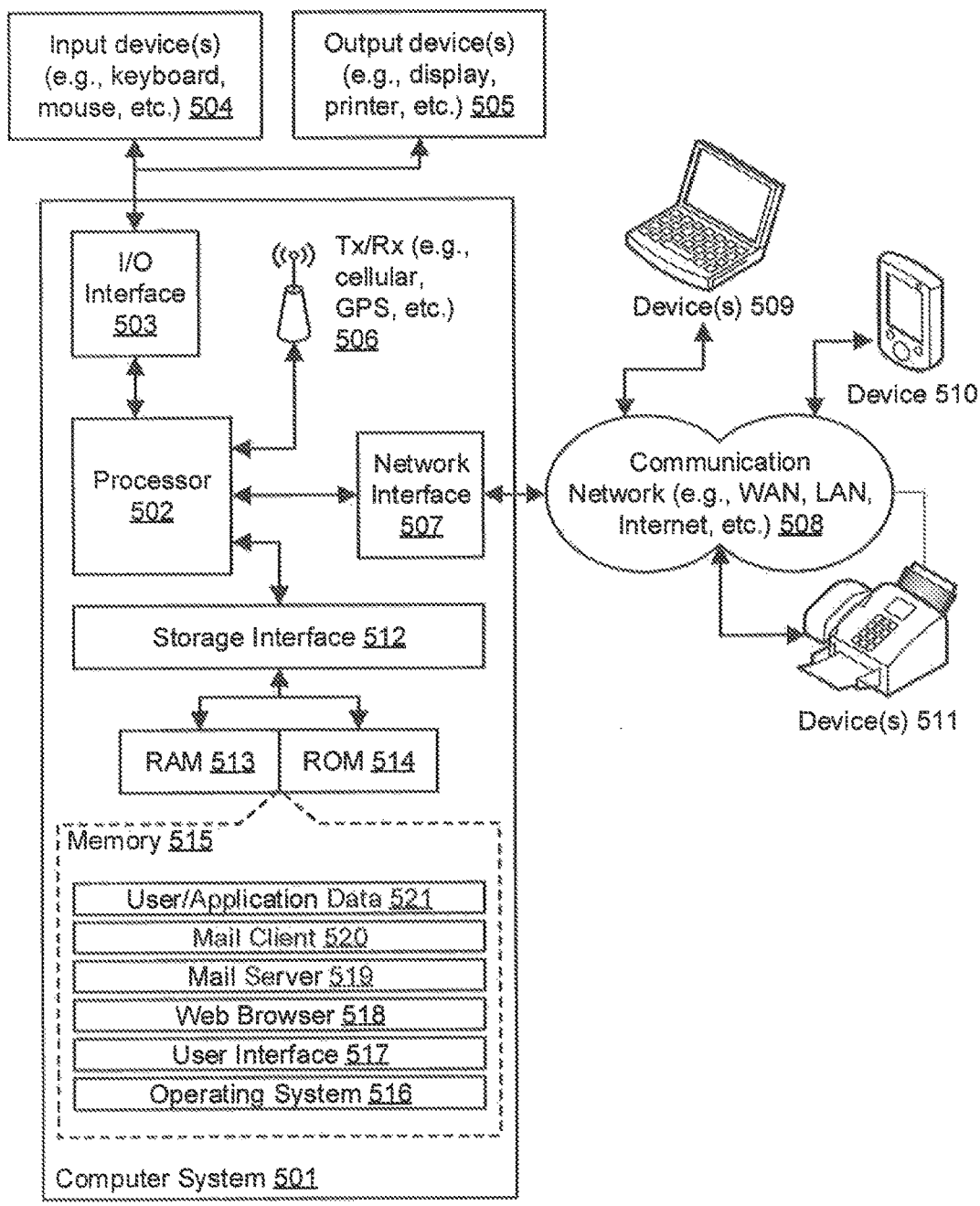
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for testing devices. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), highdefinition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., primitive executables, test cases, test scripts, resource usage, time to execute, component coverage, execution results, test reports, availability of resources at target devices, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide an efficient, effective, and light weight protocol for communication between the test agent and the device agent so as to optimize testing of the devices. The light weigh device validation (LWDV) protocol described above have a compact message format. Additionally, the LWDV protocol determines availability of resource in the target device at run time, and sequences the test execution so as to adapt to available resources at run time. Further, the LWDV protocol performs required functions with limited number of transactions between the test agent and the device agent, and supports batch execution on primitive executables. The low footprint LWDV protocol therefore enables the testing techniques to overcome the constraints of limited resources in the target device for executing the test cases. Such techniques may be useful in test automation for the application running in a miniature device.

Additionally, the techniques described in the various embodiments discussed above provide a protocol that report exact point of failure of the test case so as to augment the troubleshooting process. For example, in the testing technique described above, the device agent may report the intermediate result of each primitive executable to the test agent via the EVT_EXE_RESULT message. The test agent may then execute or skip the next primitive executable based on its dependency on the primitive executable being currently executed. This ensures accurate report on test script failure point and aid in troubleshooting while ensuring better component coverage. The aforementioned troubleshooting feature may in turn reduce the defect fixing time particularly with respect to the miniature devices.

The specification has described system and method for testing devices using LWDV protocol. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for testing a device, the method comprising:
   accessing, via a testing engine, a test script corresponding to a test case for testing the device, wherein the test script comprises a set of mutually independent primitive executables;
   packetizing, via the testing engine, one or more of the set of primitive executables based on a light weight device validation (LWDV) protocol, wherein the LWDV protocol is configured to represent a message as a series of data fields, wherein the data fields comprise a SYNC byte field, a start byte field, a payload length field, a session identification field, a message identification field, a sequence identification field, a test case identification field, a core data field, and a checksum field, and wherein the message identification field comprises a more bit field; and
   transmitting, via the testing engine, the one or more primitive executables to the device for execution, wherein transmitting the one or more primitive executables comprises:
   determining an availability of each of one or more resources in the device via the LWDV protocol; and
   transmitting the one or more primitive executables to the device based on the availability.

2. The method of claim 1, further comprising receiving a result corresponding to the execution of the one or more primitive executables from the device.

3. The method of claim 1, further comprising at least one of:
   receiving an acknowledgement upon successful transmission of the one or more of the set of primitive executables to the device, via the LWDV protocol,
   receiving an intimation upon starting the execution of the one or more of the set of primitive executables on the device, via the LWDV protocol, and
   receiving an intimation upon successful completion of the execution of the one or more of the set of primitive executables on the device, via the LWDV protocol.

4. The method of claim 1, wherein the LWDV protocol is in a tag-length-value (TLV) based message format.

5. The method of claim 1, wherein the core data field holds one or more parameters, and wherein each of the one or more parameters comprises a parameter length field and a parameter identification field.

6. The method of claim 5, wherein each of the one or more parameters further comprises a payload field.

7. A system for testing a device, the system comprising:
   at least one processor; and
   a computer-readable medium storing instructions that, when executed by the at least one processor, cause the at least one processor to perform operations comprising:
   accessing a test script corresponding to a test case for testing the device, wherein the test script comprises a set of mutually independent primitive executables;
   packetizing one or more of the set of primitive executables based on a light weight device validation (LWDV) protocol, wherein the LWDV protocol is configured to represent a message as a series of data fields, wherein the data fields comprise a SYNC byte field, a start byte field, a payload length field, a session identification field, a message identification field, a sequence identification field, a test case identification field, a core data field, and a checksum field, and wherein the message identification field comprises a more bit field; and transmitting the one or more primitive executables to the device for execution, wherein transmitting the one or more primitive executables comprises:

determining an availability of each of one or more resources in the device via the LWDV protocol; and transmitting the one or more primitive executables to the device based on the availability.

8. The system of claim 7, wherein the operations further comprise receiving a result corresponding to the execution of the one or more primitive executables from the device.

9. The system of claim 7, wherein the operations further comprise at least one of:

receiving an acknowledgement upon successful transmission of the one or more of the set of primitive executables to the device, via the LWDV protocol, receiving an intimation upon starting the execution of the one or more of the set of primitive executables on the device, via the LWDV protocol, and receiving an intimation upon successful completion of the execution of the one or more of the set of primitive executables on the device, via the LWDV protocol.

10. The system of claim 7, wherein the LWDV protocol is in a tag-length-value (TLV) based message format.

11. The system of claim 7, wherein the core data field holds one or more parameters, and wherein each of the one or more parameters comprises a parameter length field and a parameter identification field.

12. The system of claim 11, wherein each of the one or more parameters further comprises a payload field.

13. A non-transitory computer-readable storage medium having stored thereon, a set of computer-executable instructions for causing a computer comprising one or more processors to perform steps comprising:

accessing a test script corresponding to a test case for testing the device, wherein the test script comprises a set of mutually independent primitive executables;

packetizing one or more of the set of primitive executables based on a light weight device validation (LWDV) protocol, wherein the LWDV protocol is configured to represent a message as a series of data fields, wherein the data fields comprise a SYNC byte field, a start byte field, a payload length field, a session identification field, a message identification field, a sequence identification field, a test case identification field, a core data field, and a checksum field, and wherein the message identification field comprises a more bit field; and transmitting the one or more primitive executables to the device for execution, wherein transmitting the one or more primitive executables comprises:

determining an availability of each of one or more resources in the device via the LWDV protocol; and transmitting the one or more primitive executables to the device based on the availability.

14. The non-transitory computer-readable storage medium of claim 13, wherein the LWDV protocol is in a tag-length-value (TLV) based message format.

15. The non-transitory computer-readable storage medium of claim 14, wherein the core data field holds one or more parameters, and wherein each of the one or more parameters comprises a parameter length field and a parameter identification field.

16. The non-transitory computer-readable storage medium of claim 15, wherein each of the one or more parameters further comprises a payload field.

* * * * *